United States Patent [19]
Yasuma et al.

[11] Patent Number: 4,839,509
[45] Date of Patent: Jun. 13, 1989

[54] CONNECTOR DEVICE FOR CONNECTING IC CARD TO READING AND/OR WRITING APPARATUS

[75] Inventors: Jun-ichi Yasuma; Tadashi Kobayashi; Masakuni Ishikawa, all of Higashimatsuyama, Japan

[73] Assignee: Diesel Kiki Co., Ltd., Tokyo, Japan

[21] Appl. No.: 201,878

[22] Filed: Jun. 3, 1988

[30] Foreign Application Priority Data

Jun. 19, 1987 [JP] Japan .................................. 62-151457
Jul. 9, 1987 [JP] Japan .................................. 62-169659
Jul. 16, 1987 [JP] Japan .................................. 62-175932

[51] Int. Cl.$^4$ ............................................. G06K 13/00
[52] U.S. Cl. ....................................... 235/482; 235/483
[58] Field of Search .................................. 235/482, 483

[56] References Cited

U.S. PATENT DOCUMENTS 4,575,703 3/1986 Saishido ............................... 235/482

Primary Examiner—Harold I. Pitts

[57] ABSTRACT

A connector device for electrically connecting an IC card to a reading and/or writing apparatus. A first guide defining a transport path for the IC card is arranged within a casing having an insertion opening for the IC card. The transport path for the IC card extends from the insertion opening. A second guide extends in inclined relation to the transport path. A contact-probe support is guided by the second guide. The contact-probe support has supported thereon a plurality of contact probes projecting toward the first guide and an elastic arrangement biasing the contact probes toward the first guide. An abutment is associated with the contact-probe support and is arranged in crossing relation to the transport path. As a leading edge of the IC card is abutted against the abutment, the contact-probe support moves together with the IC card, away from the insertion opening and, simultaneously therewith, approaches the IC card under guidance of the second guide, to bring the contact probes into contact respectively with contacts on the IC card.

9 Claims, 5 Drawing Sheets

CONNECTOR DEVICE FOR CONNECTING IC CARD TO READING AND/OR WRITING APPARATUS

BACKGROUND OF THE INVENTION

This invention relates to a connector device for connecting an IC (integrated circuit) card to a reading and/or writing apparatus.

In general, the IC card comprises principal elements including a card-like body formed of a resin, a semiconductor integrated circuit embedded in the body, and a plurality of, for example, eight contacts provided on a front side of the body. The semiconductor integrated circuit has a PROM (programmable read only memory) and a CPU (central processing unit).

When electrically connected to the IC card, the reading and/or writing apparatus reads out information stored in the PROM of the IC card, and/or writes information to the PROM.

A connector device for electrically connecting the IC card to the reading and/or writing apparatus is disclosed in, for example, Japanese Patent Laid-Open No. 60-167076. The connector device has an insertion opening provided in a casing. As the IC card is inserted into the connector device through the insertion opening, a limit switch arranged adjacent the insertion opening detects insertion of the IC card to drive a motor. As the motor is driven, a pair of rollers drivingly connected to the motor and arranged adjacent the insertion opening are rotated to feed the IC card inwardly of the connector device. During transportation, the IC card moves while being guided by guide means. A second limit switch is arranged at the terminating end of a transport path for the IC card, defined by the guide means. The second limit switch detects that the IC card reaches the terminating end of the transport path, to output a signal. The motor is stopped in driving in response to the signal from the second limit switch, so that the IC card is stopped in movement. At a point of time substantially the same as that the motor is stopped, a contact-probe head arranged above the transport path is moved downwardly so that a plurality of contact probes supported by the contact-probe head are brought respectively into contact with the contacts on the IC card. With the contact probes maintained in contact with the contacts on the IC card, reading-out and/or writing are/is executed by the reading and/or writing apparatus. Thereafter, the contact-probe head is moved upwardly away from the IC card. Subsequently, the motor is rotated in reverse to return the IC card toward the insertion opening.

In the connector device described above, a mechanism for moving the contact-probe head vertically is composed of a spring biasing the contact-probe head upwardly and a solenoid for moving the contact-probe head downwardly against the biasing force of the spring. The arrangement is such that when the solenoid is energized, the contact-probe head is moved downwardly against the biasing force of the spring, while when the solenoid is deenergized, the contact-probe head is moved upwardly under the biasing force of the spring.

In the connector device constructed as above, it takes a relatively long time from the point of time the IC card is inserted through the insertion opening to the point of time the contact probes are brought into contact with the contacts on the IC card. This is because transportation of the IC card and downward movement of the contact-probe head must take place independently of each other in a step by step manner.

Further, since the contact-probe head is moved downwardly rapidly under the magnetic force of the solenoid to bring the contact probes into contact with the contacts on the IC card, the contact probes collide strongly against the contacts on the IC card, resulting in such problems that damages or wear occur on both the contact probes and the contacts on the IC card.

SUMMARY OF THE INVENTION

It is an object of the invention to provide a connector device for connecting an IC card to a reading and/or writing apparatus, which can shorten the time interval from insertion of the IC card to the start-up of reading-out and/or writing by the reading and/or writing apparatus, and which can minimize damages, wear and the like o contact probes of the connector device and contacts on the IC card.

According to the invention, there is provided a connector device for electrically connecting an IC card provided on its front side with a plurality of contacts, to a reading and/or writing apparatus, the connector device comprising:

(a) casing means having an insertion opening for the IC card;

(b) first guide means arranged within the casing means, the first guide means defining a transport path for the IC card, the transport path extending from the insertion opening;

(c) second guide means extending in inclined relation to the transport path for the IC card;

(d) contact-prove support means guided by the second guide means, the contact-prove support means having supported thereon a plurality of contact probes projecting toward the first guide means and corresponding respectively to the contacts on the IC card, and elastic means biasing the contact probes toward the first guide means; and (e) engaging means associated with the contact-probe support means and arranged in crossing relation to the transport path for the IC card, wherein as a leading edge of the IC card is abutted against the engaging means, the contact-probe support means moves, together with the IC card, away from the insertion opening and, simultaneously therewith, approaches the IC card under guidance of the second guide means, to bring the contact probes into contact respectively with the contacts on the IC card.

DETAILED DESCRIPTION

Various embodiments of the invention will be described below in detail with reference to the accompanying drawings.

A connector device according to an embodiment of the invention will first be described briefly with reference to FIGS. 1 and 2.

Figure 1:
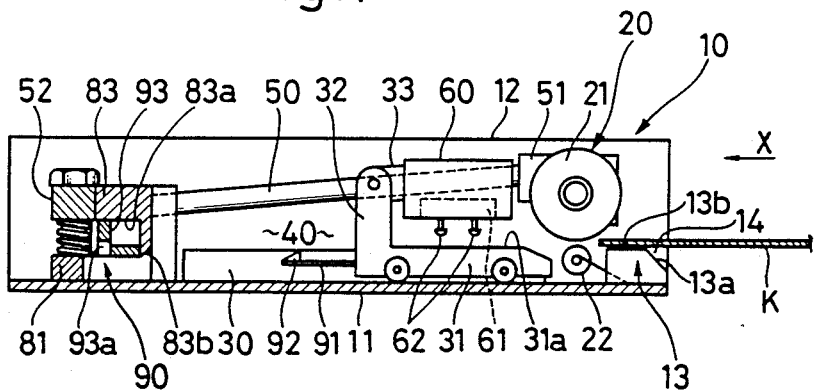
FIGS. 1 through 3 are partially cross-sectional side elevational views showing a connector device for a reading an/or writing apparatus, according to an embodiment of the invention, in order of the operation of the connector device.
Figure 2:
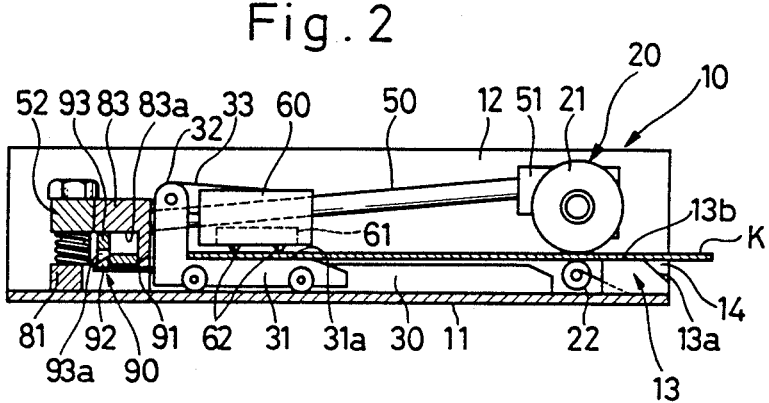

As shown in FIGS. 1 and 2, the connector device comprises a casing 10 which is composed of a bottom plate 11, a pair of upstanding side plates 12 (only one seen in FIGS. 1 and 2) mounted respectively to opposite side edges of the bottom plate 11, and a top plate (not shown) detachably mounted to upper edges of the respective side plates 12. A guide member 13 is mounted o the right-hand end of the bottom plate 11 of the casing 10 as viewed in FIGS. 1 and 2. The guide member 13 extends horizontally and perpendicularly to a transport direction of an IC (integrated circuit) card K subsequently to be described. The transport direction of the IC card K is indicated by an arrow X in FIG. 1. The guide member 13 has an upper surface formed by an oblique face section 13a and a horizontal face section 13b. The oblique face section 13a is inclined in such a manner that the oblique face section 13a extends upwardly as the distance from the right-hand end of the oblique face section 13a increases along the transport direction X. A guide member (not shown) similar to the guide member 13 is mounted also to the top plate of the casing 10. The guide member mounted to the top plate is formed with a horizontal face section and an oblique face section inclined in a direction opposite to the oblique face section 13a. The lower guide member 13 and the upper guide member which is not shown, cooperate with each other to define therebetween an insertion opening 14 through which the IC card K can be inserted.

Arranged adjacent the insertion opening 14 is a transport mechanism 20 which comprises a feed roller 21 and a pinch roller 22. The IC card K inserted through the insertion opening 14 is bitten into a nip between the rollers 21 and 22, and is transported by rotation of the rollers 21 and 22 toward an end of the casing 10 remote from the insertion opening 14, that is, in the transport direction X.

A pair of guide plates 30 (only one seen in FIGS. 1 and 2) are arranged downstream of the feed roller 12 with reference to the transport direction X. The guide plates 30 are mounted on the bottom plate 11 and extend in parallel relation to the transport direction X. A carriage 31 is arranged between the guide plates 30 for movement in the transport direction X. The carriage 31 serves as first guide means for guiding the IC card K. An upstanding abutment 32 serving as engaging means, with which the leading edge of the IC card K is engageable, is mounted to an end of the carriage 31 remote from the insertion opening 14, that is, to the left-hand end of the carriage 31 as viewed in FIGS. 1 and 2.

The IC card K is fed by the feed roller 21 while the leading edge of the IC card K is in sliding contact with an upper surface 31a of the carriage 31, which serves as a guide surface. In due course, the leading edge of the IC card K is abutted against the abutment 32. Subsequently, the IC card K is transported while pushing the abutment 32 as well as the carriage 31 toward the end of the casing 10 remote from the insertion opening 14.

It will be appreciated from the foregoing that the guide surface 31a of the carriage 31 determines or defines a transport path 40 along which the IC card K is transported. The abutment 32 crosses the transport path 40 perpendicularly.

On the other hand, a pair of straight guide rods 50 (only one seen in FIGS. 1 and 2) serving as second guide means extend in spaced parallel relation to each other and are arranged downstream of the feed roller 21 with reference to the transport direction X and above the carriage 30. The guide rods 50 are inclined in such a manner that one ends of the respective guide rods 50 remote from the insertion opening 14 are located below the other ends of the respective guide rods 50 so that the one ends thereof are located close to the transport path 40. The opposite ends of each of the guide rods 50 are supported respectively by a pair of support members 51 and 52.

A holder 60 is supported on the guide rods 50 for sliding movement therealong. The holder 60 supports a contact-probe head 61 formed of electrically insulating material. A plurality of contact probes 62 corresponding in number to contacts Ka (see FIG. 9) on the IC card K are mounted on the contact-probe head 61 in a retractable manner. The contact probes 62 extend downwardly from a lower surface of the contact-probe head 61 toward the transport path 40.

A link 33 has one end thereof pivotally connected to the holder 60. The other end of the link 33 is pivotally connected to the abutment 32 on the carriage 31.

With the arrangement described above, before the IC card K is inserted through the insertion opening 14, the holder 60 is located at a position adjacent the insertion opening 14, as shown in FIG. 1. As the IC card K is transported and the leading edge thereof is abutted against the abutment 32, the abutment 32 as well as the carriage 31 is moved away from the insertion opening 14 so that the holder 60 connected to the abutment 32 through the link 33 is also moved away from the insertion opening 14. During movement of the holder 60 away from the insertion opening 14, the holder 60 moves downwardly under guidance of the guide rods 50. Accordingly, the contact probes 62 are finally brought into contact with the contacts on the IC card K in a gentle manner, as shown in FIG. 2. Subsequently, reading-out and/or writing are/is started by a computer incorporated in the reading and/or writing apparatus (not shown).

It is possible for the connector device constructed as above to shorten the time interval from insertion of the IC card K to the start-up of reading-out and/or writing, because transportation of the IC card K and downward movement of the contact-probe head 61 take place for the same period. Further, since the contact probes 62 are brought into contact with the contacts on the IC card K slowly and gently as compared with downward movement of the contact probes under the magnetic force of the solenoid in the prior art arrangement, shocks at contact are low sufficiently, making it possible to restrain damages and wear on the contact probes 62 and the contacts on the IC card K.

Figure 3:
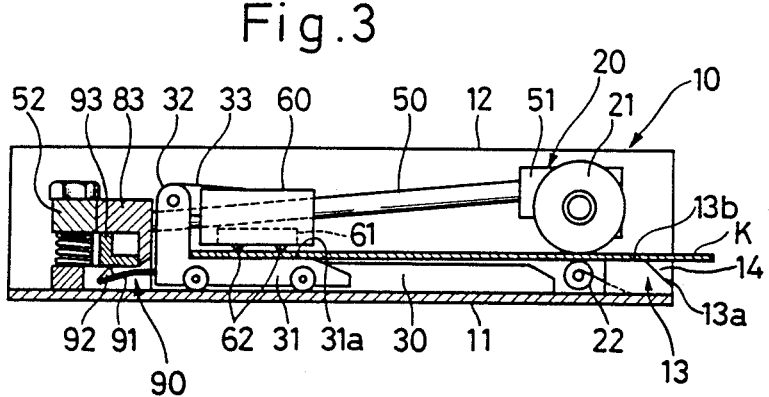

FIGS. 1 and 2 will again be referred to later together with FIG. 3, in order to explain the operation of a latching mechanism 90.

The detailed arrangement of the connector device constructed as above will next be described with reference to FIGS. 4 through 9.

Figure 7:
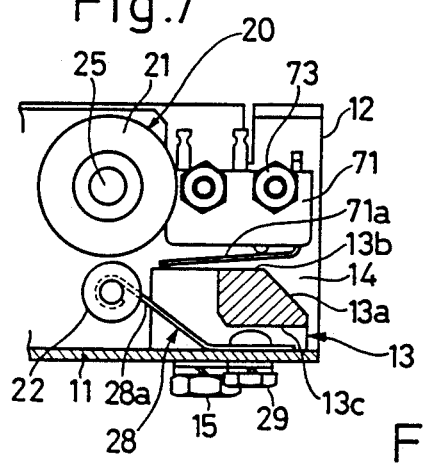
FIG. 7 is a cross-sectional view taken along line VII—VII in FIG. 5.

As shown in FIG. 7, the lower guide member 13 defining the insertion opening 14 is fixedly mounted to the bottom plate 11 by means of screws 15. The guide member 13 has a cut-out 13c formed in a longitudinal intermediate portion of the guide member 13. A leaf spring 28 has one end which is located within the cutout 13c in the guide member 13 and which is fixed to the bottom plate 11 by a screw 29. A bifurcated support portion 28a of the leaf spring 28 on the side of its other end extends obliquely upwardly. The aforesaid pinch roller 22 is rotatably supported by the forward end of the bifurcated support portion 28a.

Figure 4:
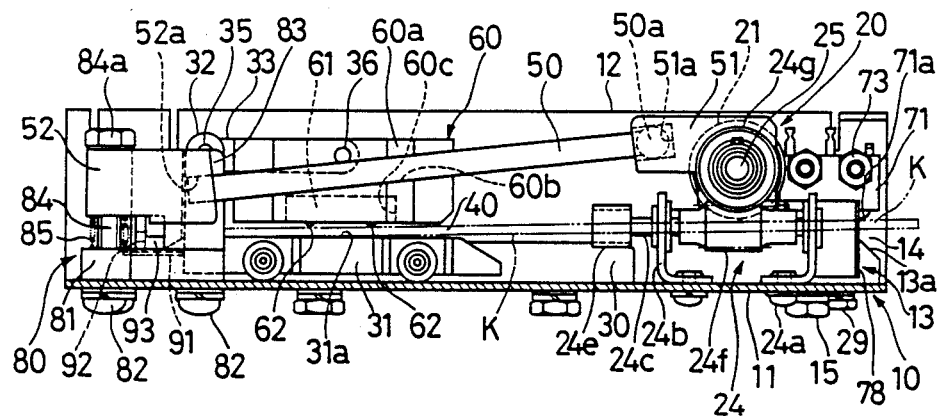
FIG. 4 is a detailed side elevational view of the connector device illustrated in FIGS. 1 through 3, with some components omitted.
Figure 5:
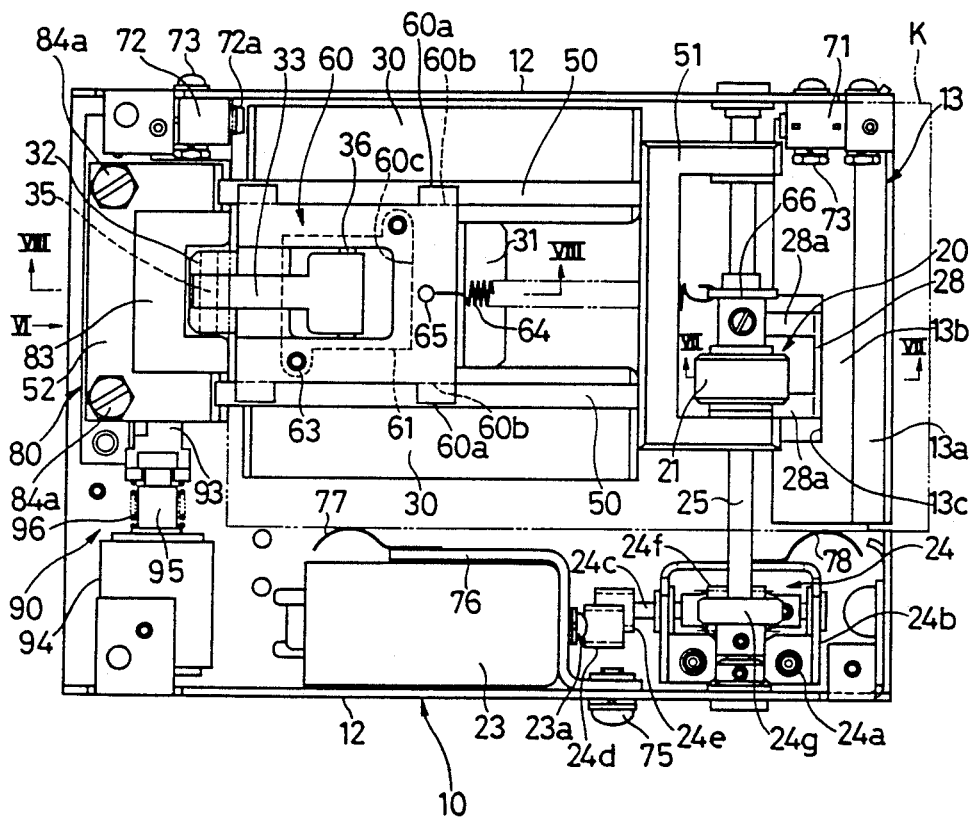
FIG. 5 is a detailed top plan view of the connector device illustrated in FIGS. 1 through 3, with a top plate of a casing removed.

As shown in FIG. 5, the transport mechanism 20 further comprises a motor 23 which is arranged adjacent one of the opposite side plates 12, i.e., adjacent the lower side plate 12 as viewed in FIG. 5. A shaft 25 has its opposite ends which are rotatably supported respectively by the opposite side walls 12 and 12 of the casing 10. Rotation of the motor 23 is transmitted to the shaft 25 through a transmission mechanism 24 including a gear train, as shown in FIGS. 4 and 5. The transmission mechanism 24 comprises a bracket 24b which is fixedly mounted to the bottom plate 11 by means of screws 24a. The bracket 24b rotatably supports a shaft 24c having one end on which a gear 24e is fixedly mounted. The gear 24e is in mesh with a gear 24d which is fixedly mounted on an output shaft 23a of the motor 23. A worm 24f is mounted also on the shaft 24c for rotation therewith, and is in mesh with a worm wheel 24g fixedly mounted on the shaft 25. Thus, rotation of the motor 23 is reduced in speed by the transmission mechanism 24, and is transmitted to the shaft 25. The aforesaid feed roller 21 is mounted on the shaft 25 for rotation therewith.

As shown in FIG. 7, a gap is defined between the outer peripheral surfaces of the respective feed and pinch rollers 21 and 22. The gap is set to a value narrower than the thickness of the IC card K, so that when the IC card K is caused to enter the gap between the feed and pinch rollers 21 and 22, the IC card K can be held under the elastic or resilient force of the leaf spring 28. Further, when the IC card K is held between the feed and pinch rollers 21 and 22, a central axis of the pinch roller 22 is positioned nearer to the insertion opening 14 than a central axis of the feed roller 21. Accordingly, as exaggeratedly shown and indicated by the phantom lines in FIG. 4, the IC card K is fed by the rollers 21 and 22 in such a fashion that the leading portion of the IC card K is inclined slightly downwardly toward the transport direction. On the other hand, the upper surface 31a of the carriage 31 is located slightly below the horizontal plane tangent to the uppermost point on the peripheral surface of the pinch roller 22 when the IC card K is clamped between the feed and pinch rollers 21 and 22. Thus, the leading edge of the IC card K reaches the abutment 32 after having been in sliding contact with the upper surface 31a of the carriage 31.

The motor 23 of the transport mechanism 24 is controlled in operation on the basis of a signal from a first limit switch 71 arranged adjacent the insertion opening 14 and a signal from a second limit switch 72 arranged adjacent the end of the casing 10 remote from the insertion opening 14, as shown in FIGS. 4, 5 and 7. The first and second limit switches 71 and 72 are fixedly mounted to the other side plate 12 of the casing 10 by means of screws 73. The first limit switch 71 outputs an operation start command signal to a drive circuit (not shown) for the motor 23, when an actuator lever 71a of the first limit switch 71 is pushed by the IC card K. On the other hand, the second limit switch 72 outputs an operation stop command signal to the drive circuit for the motor 23, when an actuator lever 72a of the second limit switch 72 is pushed by the IC card K.

As shown in FIG. 5, a bracket 76 is fixedly mounted to the one side wall 12 of the casing 10 by means of screws 75. A leaf spring 77 is attached to the forward end of the bracket 76. Further, a leaf spring 78 is attached also to the aforesaid bracket 24b. These leaf springs 77 and 78 serve to urge one side edge of the IC card K to abut the other side edge thereof against the other side plate 12 of the casing 10, thereby positioning the IC card K.

Figure 8:
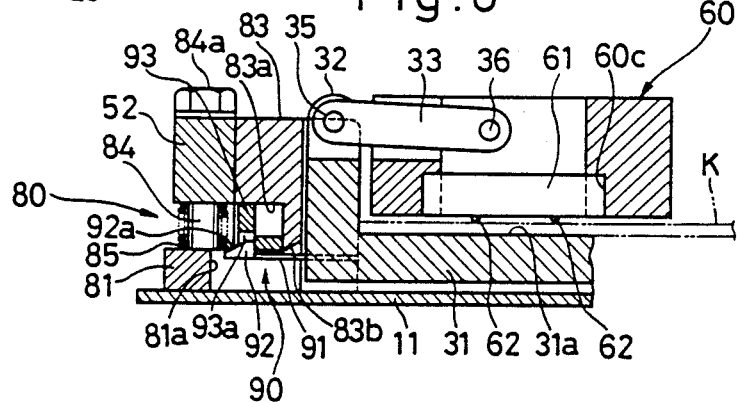
FIG. 8 is a cross-sectional view taken along line VII--VIII in FIG. 5.

As shown in FIGS. 4, 5 and 8, the one end of the link 33 is pivotally connected to the abutment 32 through a pin 35. The other end of the link 33 is pivotally connected to the holder 60 through a pin 36.

As shown in FIG. 5, the holder 60 is biased toward the insertion opening 14 under the biasing force of a return spring 64. The return spring 64 has one end which is anchored to a pin 65 mounted to the upper surface of the holder 60. The other end of the return spring 64 is anchored to a ring 66 which is rotatably mounted on the shaft 25. Before the IC card K is inserted through the insertion opening 14, the holder 60 is pulled by the return spring 64 and is abutted against the support member 51 arranged adjacent the insertion opening 14.

As shown in FIGS. 4 and 5, the holder 60 has a pair of projections 60a on each side edge of the holder 60. Each projection 60a is formed therein with a recess 60b which has a semi-circular cross-section and which extends in an inclined manner. Each of the guide rods 50 is received in the recesses 60b of the respective projections 60a on a corresponding one of the opposite side edges of the holder 60. Thus, the holder 60 can slide along the guide rods 50 while being maintained horizontal.

As shown in FIGS. 4, 5 and 8, the holder 60 is formed in its lower surface with a recess 60c. The contact-probe head 61 is received in the recess 60c and is fixedly mounted therein by screws 63.

Figure 9:
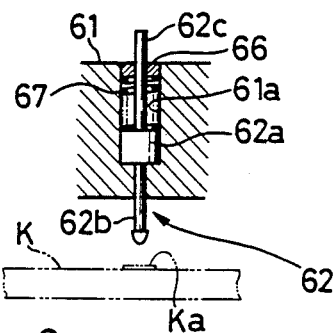
FIG. 9 is a fragmental cross-sectional view showing one of contact probes and a support arrangement therefor illustrated in FIGS. 1 through 3.

As shown in FIG. 9, the contact-probe head 61 is formed therein with a plurality of stepped bores 61a (only one shown in FIG. 9). On the other hand, each of the contact probes 62 is in the form of a pin, and is composed of an intermediate large-diameter portion 62a, a first pin portion 62b extending from a lower end of the large-diameter portion 62a and a second pin portion 62c extending from an upper end of the large-diameter portion 62c. The large-diameter portion 62a of the contact probe 62 is received in a large-diameter portion of the stepped bore 61a in the contact-probe head 61 for sliding movement along the large-diameter portion of the stepped bore 61a. The first pin portion 62b of the contact probe 62 extends through the small-diameter portion of the stepped bore 61a and projects therefrom downwardly. The second pin portion 62c of the contact probe 62 extends through a closure 66 closing the upper end of the stepped bore 61a and projects therefrom upwardly. A coil spring 67 is received in the largediameter portion of the stepped bore 61a and is interposed between the closure 66 and the upper end of the large-diameter portion 62a of the contact probe 62, so that the contact probe 62 is biased downwardly under the elastic or resilient force of the coil spring 67. A signal line (not shown) has one end thereof connected to the second pin portion 62c. The other end of the signal line is connected to the computer of the reading and/or writing apparatus (not shown).

As shown in FIG. 5, the support member 51 supporting the one ends of the respective guide rods 50 and 50 has a generally U-shaped configuration in plan composed of a pair of leg and a connecting portion extending therebetween. The pair of legs of the support member 51 are mounted on the shaft 25 for pivotal movement about the axis thereof. A pair of bores 51a are formed in the side face of the connecting portion of the support member 51 remote from the insertion opening 14, as shown in FIG. 4. The one ends of the respective guide rods 50 are formed respectively into ball sections 50a which are received respectively in the bore 51a swingably and slidably. The support member 52 supporting the other ends of the respective guide rods 50 also has a generally U-shaped configuration in plan composed of a pair of legs and a connecting portion extending therebetween. The legs of the support member 52 have their respective free end faces facing toward the insertion opening 14. Bores 52a are formed respectively in the free end faces of the legs, as shown in FIG. 4. The other ends of the respective guide rods 50 are force-fitted respectively into the bores 52a.

The above-mentioned support member 52 is adjustable in height by an adjusting mechanism 80 shown in FIGS. 4 through 6 and 8. The adjusting mechanism 80 will be described in detail. A base 81 is fixedly mounted to the bottom plate 11 of the casing 10 by means of screws 82. The base 81 has an upstanding guide post 83. The support member 52 is vertically slidable along the guide post 83 so as to embrace the same, as will be seen from FIG. 5. The adjusting mechanism 80 further comprises a pair of adjusting bolts 84. The adjusting bolts 84 extend respectively through bores 52b (see FIG. 6) formed a respective junctions between the legs and the connecting portion of the support member 52. Forward ends of the respective adjusting bolts 84 are screwed into the base 81. A pair of coil springs 85 are arranged respectively about the adjusting bolts 84 and are interposed between the upper surface of the base 81 and the lower surface of the support member 52. Thus, the support member 52 is floatingly supported under the biasing force of the coil springs 85. The upper surface of the support member 52 is abutted against the lower surfaces of the heads 84a of the respective adjusting bolts 84, thereby determining the height of the support member 52. Accordingly, adjustment of an amount, by which the adjusting bolts 84 are screwed into the base 81, enables the height of the support member 52 to be adjusted. Since, as described previously, the one ends of the respective guide rods 50 are supported by the support member 51 swingably and slidably, it is possible to adjust the height of the guide rods 50 fixedly supported on the support member 52, while maintaining the angle of inclination of the guide rods 50 unchanged.

Figure 6:
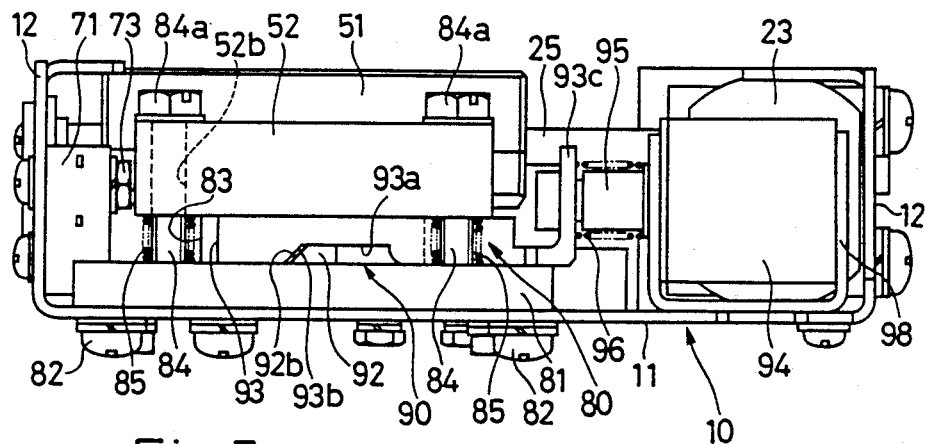
FIG. 6 is a view as viewed from the arrow VI in FIG. 5.

The abutment 32 on the carriage 31 is adapted to be retained at the terminating position of the transport path 40, by a latching mechanism 90. Specifically, as shown in FIGS. 1 through 3 and 8, a leaf spring 91 is mounted adjacent the lower end of the abutment 32, and extends therefrom away from the insertion opening 14. A latching pawl 92 is provided at the forward end of the leaf spring 92. A part of an upper surface of the latching pawl 92 is formed into a first inclined face 92a, and a side face of the latching pawl 92 is formed into a second inclined face 92b (see FIG. 6). On the other hand, a rectangular cut-out 83a is formed in the side face of the guide post 83 remote from the insertion opening 14. The rectangular cut-out 83a extends horizontally perpendicularly to the transport direction X. The base 81 is formed therein with a slit 81a contiguous to the cut-out 83a. The slit 81a extends in the transport direction X at a location corresponding to the leaf spring 91 mounted to the abutment 32. Further, the guide post 83 has an end face which faces toward the insertion opening 14. An inclined face 83b is formed at a lower edge of the end face of the guide post 83. The inclined face 83b is continuous to the slit 81a, and corresponds to the first inclined face 92a on the latching pawl 92. An elongated latching member 93 having an L-shaped cross-section is accommodated in the cut-out 83a in the guide post 83 for horizontal sliding movement in a direction perpendicular to the transport direction X. The latching member 93 has a bottom surface which is contiguous to the inclined surface 83b. A cut-out 93a is formed in the bottom surface of the longitudinally intermediate portion of the latching member 93. The cut-out 93a is located at the side edge of the bottom of the latching member 93 remote from the insertion opening 14. As shown in FIG. 6, a second inclined face 93b corresponding to the inclined face 92b on the latching pawl 92 is formed on one side of the cut-out 93a.

The latching member 93 is formed at its one end with a connecting portion 93c which extends vertically as shown in FIG. 6. The connecting portion 93c is connected to an actuator rod 95 of an unlatching solenoid 94 which is fixedly mounted to the bottom plate 11 through a bracket 98. When energized, the solenoid 94 pulls the latching member 93 rightwardly as viewed in FIG. 6. Further, a coil spring 96 is arranged about the actuator rod 95 so that the latching member 93 is biased leftwardly as viewed in FIG. 6 under the biasing force of the coil spring 96. Thus, normally, as shown in FIGS. 1, 2, 6 and 8, the cut-out 93a is located at a position corresponding to the latching pawl 92. In the course of forward movement of the carriage 31 in the transport direction X, the first inclined face 92a on the latching pawl 92 is abutted against the inclined face 83b on the guide post 83. Then, the leaf spring 91 is elastically deformed to enable the latching pawl 92 to be moved along the inclined face 83b. The latching pawl 92 is further moved along the bottom surface of the latching member 93. As the IC card K reaches substantially the transport terminating position, the latching pawl 92 is caused to enter the cut-out 93a in the latching member 93 under the elasticity or resiliency of the leaf spring 91. As a result, the latching pawl 92 is latched to the latching member 93.

As the solenoid 94 is energized, the latching member 93 is moved rightwardly as viewed in FIG. 6. Rightward movement of the latching member 93 causes the inclined face 93b to push the second inclined face 92b on the latching pawl 92. The leaf spring 91 is elastically deformed as shown in FIG. 3, to disengage the latching pawl 92 from the cut-out 93a. The latching pawl 92 is moved to a position lower than the bottom surface of the latching member 93. Thus, the latching pawl 92 is unlatched from the latching member 93.

In the connector device constructed as above, as the IC card K is inserted through the insertion opening 14, the actuator lever 71a of the first limit switch 71 is pushed by the IC card K so that the first limit switch 71 outputs the operation start command signal. In response to the signal from the first limit switch 71, the motor 23 is rotatively driven in the normal direction, to feed the IC card K along the transport path 40 toward the end of the casing 10 away from the insertion opening 14. The IC card K is transported in such a fashion that the leading edge of the IC card K is directed slightly obliquely downwardly, while the leading edge is in sliding contact with the upper surface 31a of the carriage 31. As the leading edge of the IC card K is abutted against the abutment 32 on the carriage 31, on and after this, the IC card K is transported while being accompanied with the carriage 31. In the course of transportation of the IC card K, the contact-probe head 61 is moved, together with the holder 60, toward the end of the casing 10 remote from the insertion opening 14 and, in addition thereto, the contact-probe head 61 moves downwardly while being maintained horizontal under guidance of the guide rods 50. During transportation of the IC card K, the lower ends of the respective contact probes 62 are brought into contact with the respective contacts Ka on the IC card K. As the IC card K is further transported, the contact-probe head 61 moves further downwardly, though the height of the contact probes 62 are maintained unchanged. As a consequence, the contact probes 62 are pushed back upwardly into the contact-probe head 61 relatively thereto, against the respective coil springs 67.

As the leading edge of the IC card K reaches the terminating end of the transport path 40, the leading edge pushes the actuator lever 72a of the second limit switch 72 so that the operation stop command signal is outputted from the second limit switch 72. The motor 23 is stopped in operation in response to the signal from the second limit switch 72. Thus, transportation of the IC card K is completed. At this time, the coil springs 67 press the respective contact probes 62 against the respective contacts on the IC card K, with the biasing force corresponding to the amount by which the contact probes 62 are pushed back into the head 61. In this connection, the angle of inclination and the height of the guide rods 50 are set such that the contact pressure between the contact probes 62 and the contacts Ka on the IC card K due to the coil springs 67 is brought to an adequate value.

At completion of transportation of the IC card K, the latching pawl 92 is latched to the latching member 93 as described previously. Accordingly, it is possible to retain the IC card K to the position at the completion of transportation, against the elastic force of the return spring 64 applied to the holder 60.

The signal from the second limit switch 72 is sent also to the computer of the reading and/or writing apparatus, so that the computer begins to read out the information on the IC card K and/or to write information to the IC card K. When such reading-out and/or writing are-/is completed, the computer outputs a completion signal. In response to the completion signal, the solenoid 94 is energized to unlatch the latching pawl 92 from the latching member 93. Subsequently, the motor 23 is rotatively driven in reverse for a predetermined period of time, to return the IC card K toward the insertion opening 14.

In the course of return movement of the IC card K, the holder 60 biased by the return spring 64 is returned, together with the carriage 31, toward the insertion opening 14, following the return movement of the IC card K. The holder 60 is finally abutted against the support member 51. In the course of return movement, the holder 60 moves upwardly under guidance of the guide rods 50 so that the contact probes 62 are separated from the respective contacts on the IC card K.

After an elapse of the predetermined period of time from the start of the reverse rotation of the motor 23, the solenoid 94 is deenergized to permit the latching member 93 to be returned to its original position under the biasing force of the coil spring 96.

In the manner described above, the entire components of the connector device are returned to their respective original positions before insertion of the IC card K.

Additionally, in case where there is a possibility of use of IC cards K different in thickness from each other, some inconveniences may occur if the guide rods 50 are maintained unchanged in height and angle of inclination. Specifically, if the IC card K is relatively thick, the pushed-back amount of the contact probes 62 increases at the transport completed position. This increases the contact pressure between the contact probes 62 and the contacts Ka on the IC card K due to the coil springs 67, resulting in premature damages and wear on the contact probes 62 and the contacts Ka on the IC card K. On the other hand, if the IC card K is relatively thin, the pushed-back amount of the contact probes 62 decreases to decrease the contact pressure between the contact probes 62 and the contacts Ka on the IC card K, resulting in defective or insufficient contact. In this connection, however, it is possible for the connector device illustrated in FIGS. 1 through 9 to adjust the height of the guide rods 50 by the adjusting mechanism 80, in compliance with the thickness of the IC card K. Accordingly, even if an IC card K having its thickness different from that of the previous one is inserted through the insertion opening 14, the pushed-back amount of the contact probes 62 can be maintained constant by virtue of the above adjustment in height of the guide rods 51, making it possible to always bring the above-mentioned contact pressure to an adequate value.

The guide rods may be adjustable in angle of inclination in accordance with the thickness of the IC card, in order to bring the aforesaid contact pressure substantially to an adequate value. That is, one support member arranged adjacent the insertion opening is fixedly mounted to the casing, while the other support member arranged remote from the insertion opening is supported by a height adjusting mechanism similar to the adjusting mechanism employed in the previous embodiment described with reference to FIGS. 1 through 9. Each of the guide rods has its opposite ends formed respectively into ball sections. One of the ball sections of each of the guide rods is swingably and slidably inserted into a corresponding one of a pair of bores formed in the one support member, while the other ball section of the guide rod is likewise swingably and slidably fitted into a corresponding one of a pair of bores formed in the other support member. It is possible for such arrangement to adjust the angle of inclination of the guide rods by varying the height of the other support member.

Figure 10:
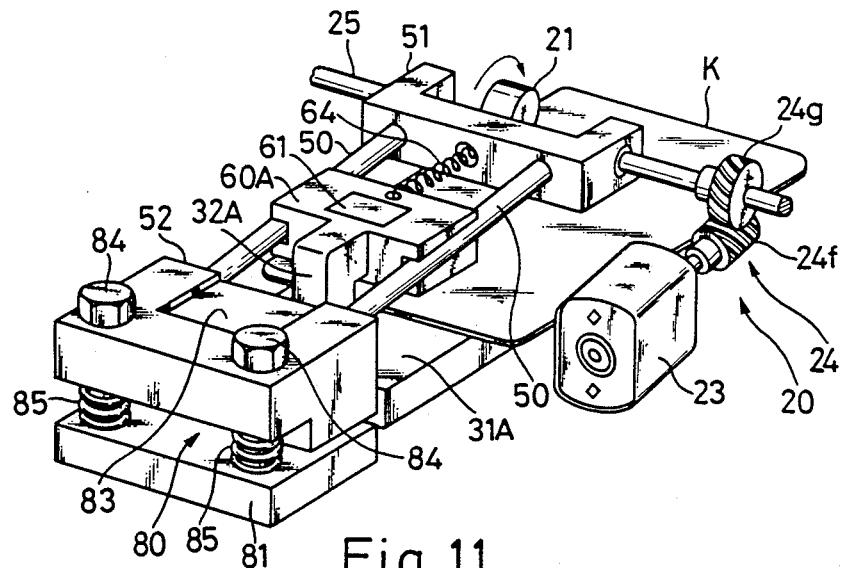
FIG. 10 is a perspective view of a connector device according to another embodiment of the invention.
Figure 11:
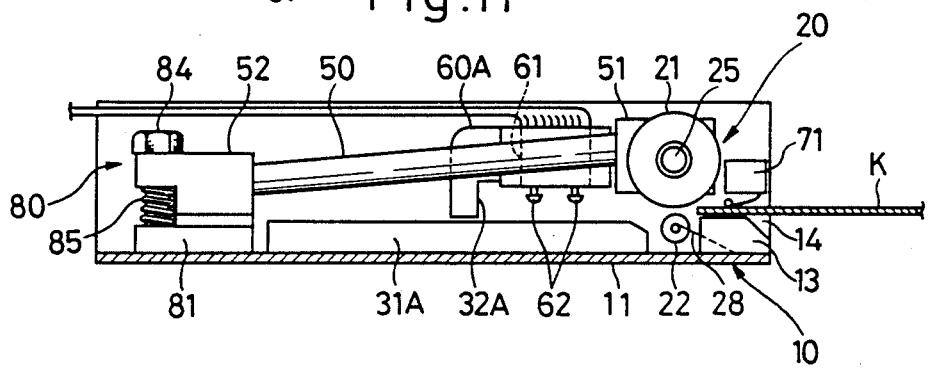
FIGS. 11 and 12 are side elevational views showing the connector device illustrated in FIG. 10, in order of the operation thereof.
Figure 12:
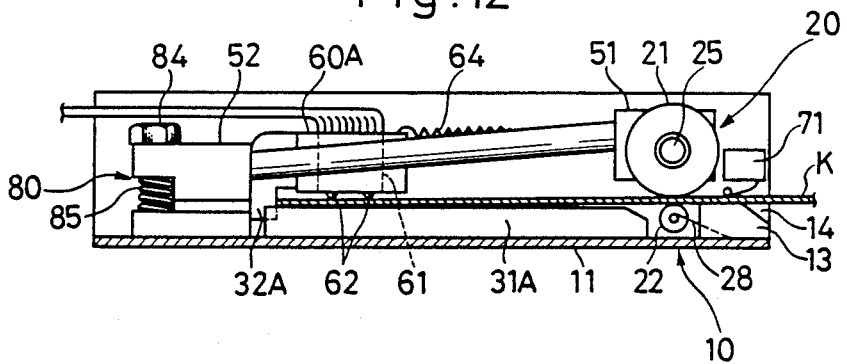

FIGS. 10 through 12 shows another embodiment of the invention. In FIGS. 10 through 12, components and parts like or similar to those illustrated in FIGS. 1 through 9 are designated by the like or similar reference numerals, and the detailed description of such like or similar components and parts will therefore be omitted to avoid repetition.

The embodiment shown in FIGS. 10 through 12 is different from the previous embodiment illustrated in FIGS. 1 through 9 in that in substitution for the carriage 31 for guiding the IC card K in the previous embodiment, a guide plate 31A is employed which is fixedly mounted to the bottom plate 11 of the casing 10, and that in substitution for the abutment 32 on the carriage 31 in the previous embodiment, an abutment 32A serving as engaging means is employed which is provided on a holder 60A and which extends downwardly from the end of the holder 60A remote from the insertion opening 14. As shown in FIG. 11, the IC card K inserted through the insertion opening 14 is fed by the feed roller 21, while the leading edge of the IC card K is in sliding contact with an upper surface of the guide plate 31A. In the meantime, the leading edge of the IC card K is abutted against the abutment 32A. Subsequently, as shown in FIG. 12, the holder 60A is moved together with the IC card K toward the end of the casing 10 remote from the insertion opening 14. In the course of the movement, the holder 60A moves downwardly under guidance of the guide rods 50, to bring the contact proves 62 into contact with the contacts on the IC card K.

Moreover, the embodiment illustrated in Figs. 10 through 12 is not provided with the latching mechanism 90 of the previous embodiment shown in FIGS. 1 through 9. Specifically, the embodiment illustrated in FIGS. 10 through 12 is designed such that the friction force between the IC card K and the feed roller 21 is utilized to retain the IC card K to the position where transportation of the IC card K is completed, against the biasing force of the return spring 64.

Figure 13:
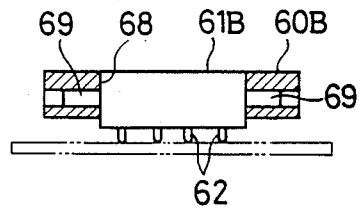
FIG. 13 is a cross-sectional view showing a modification of a holder for a contact-probe head illustrated in FIGS. 1 through 3, the holder being cross-sectioned along a vertical plane perpendicular to the transport direction of the IC card.
Figure 14:
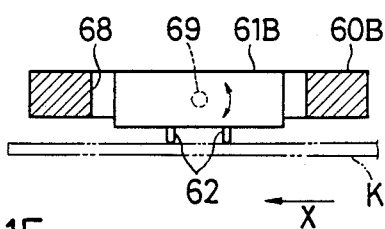
FIG. 14 is a cross-sectional view of the holder illustrated in FIG. 13, taken along a vertical plane parallel to the transport direction of the IC card.

FIGS. 13 and 14 show a modification of the holder 60 in the first-mentioned embodiment. That is, a holder 60B according to the modification is formed therein with a bore 68 in which a contact-probe head 61B is accommodated. The contact-probe head 61B is provided with a pair of pins 69 projecting respectively from the opposite sides of the head 61B. The pins 69 extend respectively through bores formed in the holder 60B, such that the contact-probe head 61B is supported by the holder 60B for pivotal movement relative thereto about a common axis of the pins 69. The pins 69 serving respectively as pivots extend perpendicularly to the transport direction X, and are located centrally between the front row of contact probes 62 and the rear row of contact probes 62 with reference to the transport direction X.

The arrangement illustrated in FIGS. 13 and 14 has the following advantages. That is, there may often be a case where the contact-probe head 61B is brought to a position not substantially parallel to the IC card K, because of manufacturing and assembling errors of various component parts of the connector device, in particular, because of errors in the angle of inclination of the guide rods 50. In this case, the pushed-back amount of one of the front and rear rows of contact probes 62 is more than that of the other row, so that the contact pressure between the one row of contact probes and the corresponding contacts on the IC card K tends to increase as compared with the contact pressure between the other row of contact probes and the corresponding contacts on the IC card K. With the arrangement illustrated in FIGS. 13 and 14, however, the contact-probe head 61B pivotally moves about the common axis of the pins 69 in response to the difference in contact pressure. Thus, it is possible to equalize the contact pressures at the respective front and rear rows of contact probes 62 to each other. Additionally, if such an arrangement is adopted as to adjust the angle of inclination of the guide rods, the advantages due to the arrangement of the holder 60B can further be enhanced.

Figure 15:
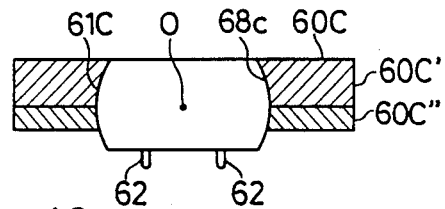
FIG. 15 is a cross-sectional view showing another modification of the holder for the contact-probe head, taken along a vertical plane parallel to the transport direction of the IC card.

A holder 60C and a contact-probe head 61C shown in FIG. 15 are also designed for the same purpose as the modification illustrated in FIGS. 13 and 14. Specifically, the contact-probe head 61C has front and rear surfaces with reference to the transport direction, and each of the front and rear surfaces is formed into an arcuate shape. The holder 60C is composed of a pair of plates 60C' and 60C" which are formed therein with a bore 68C. Each of front and rear wall surfaces of the bore 68C is also formed into a arcuate shape correspondingly to the arcuate front and rear surfaces of the contact-probe head 61C. Also in this case, a center O about which the contact-probe head 61 pivotally moves extends perpendicularly to the transport direction and which is located centrally between the front and rear rows of contact probes 62.

Figure 16:
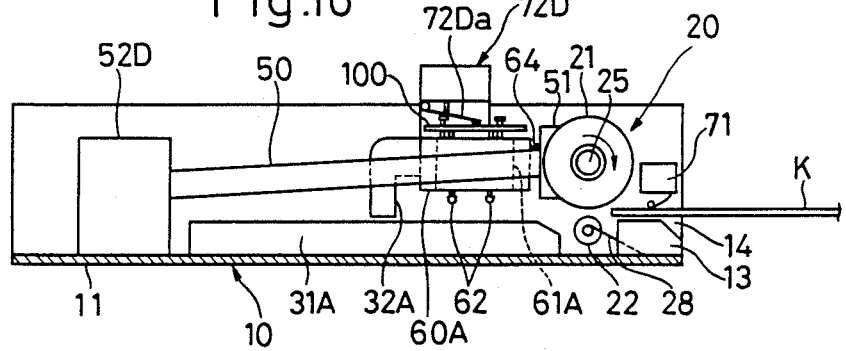
FIG. 16 is a side elevational view of a connector device according to still another embodiment of the invention.
Figure 17:
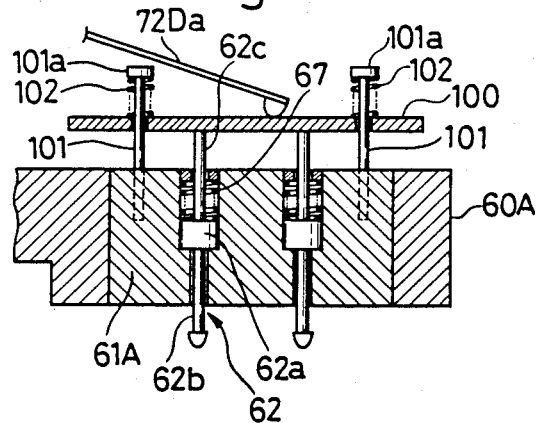
FIG. 17 is an enlarged fragmental cross-sectional view of a contact-probe head and detecting switch means for stopping operation of transport means of the connector device illustrated in FIG. 16, the contact-probe head and the detecting means being cross-sectioned along a vertical, plane parallel to the transport direction of the IC card.

FIGS. 16 and 17 show still another embodiment of the invention. In FIGS. 16 and 17, components and parts like or similar to those illustrated in FIGS. 1 through 9 and those illustrated in FIGS. 10 through 12 are designated by the same or like reference numerals, and the description of such like or similar components and parts will therefore be omitted.

In the embodiment illustrated in FIGS. 16 and 17, a second limit switch 72D is mounted on the holder 60A such that when the amount by which the contact probes 62 are pushed-back into the contact-probe head 61A reaches a predetermined value, the second limit switch 72D is actuated to output a signal for stopping the transport mechanism 20. Specifically, a vertically movable plate 100 formed of electrically insulating material is arranged above the contact-probe head 61A. A plurality of upstanding guide rods 101 fixedly mounted to the upper surface of the contact-probe head 61A extend through the movable plate 100 so that the movable plate 100 is supported vertically movably along the guide rods 101. Coil springs 102 weaker in biasing force than the coil springs 67 for biasing the contact probes 62 are interposed between the movable plate 100 and respective heads 101a of the guide rods 101. The movable plate 100 is in contact with the upper ends of the second pin portions 62c of the respective contact probes 62 under the biasing force of the coil springs 102 and under the own weight of the movable plate 100. The second limit switch 72D is arranged in such a manner that the actuator lever 72Da is spaced upwardly away from the upper surface of the movable plate 100, or the actuator lever 72Da is in contact with the upper surface of the movable plate 100.

In the embodiment illustrated in FIGS. 16 and 17, during movement of the holder 60A away from the insertion opening 14 following the IC card K, the holder 60A moves downwardly under guidance of the guide rods 50. In the course of transportation of the IC card K, the contact probes 62 are brought into contact with the respective contacts on the IC card K. Thereafter, as the contact-probe head 62 moves further downwardly, the movable plate 100 is pushed by the contact probes 62 and is moved upwardly relatively to the contact-prove head 61A and to the second limit switch 72D. As the amount by which the contact probes 62 are pushed-back into the contact-probe head 61A relatively thereto reaches a predetermined value, pivotal movement of the actuator lever 72Da due to the movable plate 100 reaches an actuating angle, and the second limit switch 62D outputs the operation stop command signal. In response to the signal, the transport mechanism 20 is stopped in operation so that transportation of the IC card K is stopped. Thus, the pushed-back amount of the contact probes 62 can always be maintained at a constant value even if the IC card K having different thickness is inserted through the insertion opening 14, making it possible to bring the contact pressure between the contact probes 62 and the contacts on the IC card K to an adequate value. Saying in addition, in the embodiment shown in FIGS. 16 and 17, the transport distance of the IC card K varies depending upon the thickness thereof. Since adjusting in height of the support member 52D is not required for the embodiment shown in FIGS. 16 and 17, the support member 52D is fixedly mounted to the bottom plate 11 of the casing 10.

Figure 18:
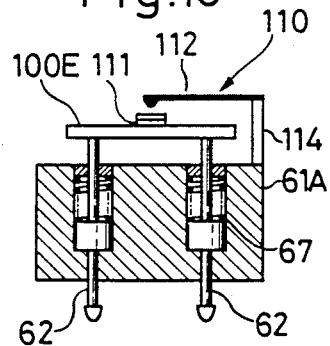
FIG. 18 is a view similar to FIG. 17, but showing a modification of the detecting switch means for stopping operation of the transport means.

Another embodiment shown in FIG. 18 has the same purpose as the embodiment illustrated in FIGS. 16 and 17. That is, a movable plate 100E formed of electrically insulating material is fixedly mounted to upper ends of respective contact probes 62. Further, detecting means outputting the signal for stopping the operation of the transport mechanism comprises a switch 110 in place of the second limit switch employed in each of the previous embodiments. The switch 110 is mounted to the contact-probe head 61A and is composed of a pair of contact pieces 111 and 112. One contact piece 111 is attached to the upper surface of the movable plate 100E, while the other contact piece 112 is formed of spring material and is attached to an upstanding post 114 mounted to the upper surface of the contact-probe head 61A. As the pushed-back amount of the contact probes 62 reaches a set value, the movable plate 100E moved upwardly by the contact probes 62 brings the contact piece 111 into contact with the contact piece 112, so that the switch 110 outputs the operation stop command signal.

It is to be understood that the invention is not limited to the specific forms described above, but various modifications and variations can be made to the invention.

For example, the arrangement may be such that a pair of guide members are mounted respectively to the opposite side plates of the casing, and a pair of inclined parallel grooves are formed respectively in the guide members. In this case, two pairs of projections are provided respectively on the opposite sides of the holder and are slidably fitted respectively in the inclined grooves.

Further, the arrangement may be such that the holder is located above the transport path, and the guide means is located below the transport path. In this case, a pair of legs are provided respectively on the opposite sides of the holder and extend downwardly therefrom. The legs have their respective lower ends which are slidably supported by the guide means. The guide means is inclined in such a manner that the guide means goes downwardly as the distance from the insertion opening in the casing increases, in other words, in such a manner that a vertical downward distance from the transport path increases gradually as the distance from the insertion opening increases.

The IC card may be inserted manually to the terminating end of the transport path, without the use of the transport means.

It has been described in the above embodiments that each contact probe is in the form of a pin and is biased by a coil spring. However, a leaf spring may be used which serves both as a contact probe and a biasing element. In this case, the leaf spring is in contact with a corresponding one of the contacts on the IC card, under the biasing force of the leaf spring per se.

What is claimed is:

1. A connector device for electrically connecting an IC card provided on its front side with a plurality of contacts, to a reading and/or writing apparatus, said connector device comprising:
   (a) casing means having an insertion opening for the IC card;
   (b) first guide means arranged within said casing means, said first guide means defining a transport path for the IC card, said transport path extending from said insertion opening;
   (c) second guide means extending in inclined relation to said transport path for the IC card;
   (d) contact-probe support means guided by said second guide means, said contact-probe support means having supported thereon a plurality of contact probes projecting toward said first guide means and corresponding respectively to the contacts on said IC card, and elastic means biasing said contact probes toward said first guide means; and
   (e) engaging means associated with said contact-probe support means and arranged in crossing relation to said transport path for the IC card, wherein as a leading edge of the IC card is abutted against said engaging means, said contact-probe support means moves, together with the IC card, away from said insertion opening and, simultaneously therewith, approaches the IC card under guidance of said second guide means, to bring said contact probes into contact respectively with the contacts on the IC card.

2. A connector device according to claim 1, further comprising transport means for transporting the IC card along said transport path, and a return spring biasing said contact-probe support means toward said insertion opening.

3. A connector device according to claim 2, further comprising latching means for latching said engaging means at a position where transportation of the IC card is completed, and means for releasing latching of said engaging means by said latching means.

4. A connector device according to claim 2, wherein said contact-probe support means includes a holder slidably supported by said second guide means and biased by said return spring toward said insertion opening, and a head mounted to said holder and supporting said contact probes.

5. A connector device according to claim 4, wherein said first guide means comprises a carriage having an upper surface serving as a guide surface for the IC card, and that said engaging means comprises an abutment mounted to an end of said carriage remote from said insertion opening, the connector device further comprising a link having one end pivotally connected to said abutment and the other end pivotally connected to said holder.

6. A connector device according to claim 4, wherein said first guide means comprises a guide member fixedly mounted to said casing means, and wherein said engaging means comprises an abutment mounted to an end of said holder remote from said insertion opening.

7. A connector device according to claim 4, wherein said guide means has a rod-like configuration, the connector device further comprising a support member by which at least one of opposite ends of said guide means remote from said insertion opening is supported, and an adjusting mechanism by which said support member is supported for vertical movement.

8. A connector device according to claim 4, wherein said contact-probe head is supported for pivotal movement relative to said holder about an axis extending perpendicularly to said transport path for the IC card.

9. A connector device according to claim 2, further comprising first detecting switch means and second detecting switch means, said first detecting switch mean being arranged adjacent said insertion opening, said first detecting switch means outputting a signal for starting operation of said transport means when said first detecting switch means detects insertion of the IC card, said second detecting switch means being mounted on said contact-probe support means, each of said contact probes being in the form of a pin having a first pin portion projecting toward said first guide means and a second pin portion projecting away from said first guide means, said second pin portion being associated with said second detecting switch means, said contact probes being biased by coil spring means serving as said biasing means, said second detecting switch means outputting a signal for stopping the operation of said transport means when said second detecting switch means detects that said contact probes are pushed back by a set amount against said coil spring means.

* * * * *